(12) United States Patent
Giebl et al.

(10) Patent No.: US 12,457,270 B1
(45) Date of Patent: Oct. 28, 2025

(54) METHOD OF MANAGING MESSAGES

(71) Applicant: HiveMQ GmbH, Landshut (DE)

(72) Inventors: Silvio Giebl, Landshut (DE); Henning Lohse, Landshut (DE); Lukas Brandl, Landshut (DE)

(73) Assignee: HiveMQ GmbH, Landshut (DE)

( * ) Notice: Subject to any disclaimer, the term of this patent is extended or adjusted under 35 U.S.C. 154(b) by 0 days.

(21) Appl. No.: 18/989,505

(22) Filed: Dec. 20, 2024

(30) Foreign Application Priority Data

Apr. 26, 2024 (GB) .................................. 2405917

(51) Int. Cl.
*H04L 67/55* (2022.01)
(52) U.S. Cl.
CPC .................................. *H04L 67/55* (2022.05)
(58) Field of Classification Search
CPC ........................................................ H04L 67/55
USPC ........................................................ 709/206
See application file for complete search history.

(56) References Cited

U.S. PATENT DOCUMENTS

| 2006/0145831 | A1* | 7/2006 | Bornhoevd | ............. | G06F 16/26 340/539.22 |
| 2018/0295062 | A1 | 10/2018 | Bellesa et al. | | |
| 2019/0014188 | A1 | 1/2019 | Schreter | | |
| 2021/0112013 | A1* | 4/2021 | Fugitt | ............. | H04L 41/30 |
| 2025/0036442 | A1* | 1/2025 | Gautam | ............. | G06F 9/45558 |

FOREIGN PATENT DOCUMENTS

| CN | 113014634 | B | * | 1/2023 | ......... | H04L 41/0663 |
| CN | 117221316 | A | * | 12/2023 | | |
| WO | 2012156851 | A1 | | 11/2012 | | |
| WO | 2022031162 | A1 | | 2/2022 | | |

OTHER PUBLICATIONS

Giebl, Silvio_Master Thesis_Messaging Guarentees at Multi-Datacenter Cluster Bridging of Publisher-Subscriber-Systemen, Sep. 8, 2020.
MQTT specification, Mar. 7, 2019.
GB Combined Search and Examination Report dated Sep. 25, 2024 for GB Application No. GB2405917.2.
Andes: A Highly Scalable Persistent Messaging System - Web Services (ICWS), 2012 IEEE 19th International Conference on, IEEE, Jun. 24, 2012, pp. 504-511, XP32217727.
European Extended Search Report dated Sep. 4, 2025 for European Patent Application No. 25163394.7.

* cited by examiner

*Primary Examiner* — Zi Ye
(74) *Attorney, Agent, or Firm* — EIP US LLP (57) ABSTRACT

There is provided a method for managing messages in a broker cluster. The broker cluster comprises a plurality of nodes each of which maintains a separate counter. The master node of the plurality of nodes in the broker cluster receives a request containing a payload for a message to be stored at the master node. The master node generates a key for the message, wherein the key comprises at least: a client identifier of a client to receive the message, and a sequence number from the counter of the master node. The master node stores a message formed based on the key and the payload as a key-value pair at the master node.

16 Claims, 9 Drawing Sheets

METHOD OF MANAGING MESSAGES

CROSS REFERENCE TO RELATED APPLICATIONS

This application claims priority under 35 U.S.C. § 119(a) and 37 CFR § 1.55 to UK Patent Application No. 2405917.2, filed on Apr. 26, 2024, the entire content of which is incorporated herein by reference.

TECHNICAL FIELD

The present invention relates to a method of managing messages performed by a master node and an information processing apparatus configured to perform the role of a master node in a broker cluster. A program containing instructions to perform the method is also provided.

BACKGROUND

MQTT (Message Queuing Telemetry Transport) was created in 1999 by Andy Stanford Clark and Arlen Nipper. It was designed to be lightweight and suitable for devices like sensors and actuators.

MQTT is a publish-subscribe based messaging protocol designed specifically for use in environments with limited bandwidth and high latency. The protocol enables communication between devices. Publishing devices can send messages on specific topics, while other devices can subscribe to those topics to receive the messages. In between the publishing devices and the subscribing devices is provided a broker that processes and distributes the messages.

MQTT has applications in Internet of Things (IoT), providing efficient communication between sensors, actuators, and other devices. It finds application in networks that are not always reliable, such as satellite links commonly used in the oil and gas industry.

As MQTT is suitable for handling large volumes of messages, it is desirable to find ways to make the broker run more efficiently as it may process large numbers of messages between the publishing devices and the subscribing devices.

SUMMARY

According to a first aspect of the present invention, there is provided a method of managing messages performed by a master node in a broker cluster, wherein the broker cluster comprises a plurality of nodes each of which maintains a separate counter, the method comprising: receiving a request containing a payload for a message to be stored at the master node; generating, by the master node, a key for the message, wherein the key comprises at least: a client identifier of a client to receive the message, and a sequence number from the counter of the master node, and storing a message formed based on the key and the payload as a key-value pair in a storage at the master node.

The key may further comprise an identifier of the master node that generates the key.

In some embodiments, each counter may be configured to increase strictly monotonically.

The request containing a payload for a message may be received from a publisher client. In such cases, the identity of the master node among the plurality of nodes may be determined based on a hash of an identifier of the publisher client.

The method may further comprise sending the message to a follower node of the plurality of nodes in the broker cluster for storage. The follower node may, upon receiving the message, compare the sequence number used to generate the key of the message with a sequence number of a counter of the follower node. The follower node may store the message in a storage at the follower node.

In a case that the sequence number used to generate the key of the message is greater than or equal to the sequence number of the counter of the follower node, the follower node may advance the sequence number of the counter of the follower node to a value greater than the sequence number used to generate the key.

In some implementations, in a case that the master node becomes unavailable, the follower node may become the master node. In such cases, after the following node becomes the master node, the method may comprise: receiving, at the master node of the plurality of nodes, a second request containing a second payload for a second message to be stored at the master node; generating, by the master node, a key for the second message, wherein the key comprises at least: an identifier of a client to receive the second message, and a sequence number from the counter of the master node, and storing a message formed based on the key and the payload as a key-value pair at the master node.

The client that receives the message may be a subscriber client that has sent a request to subscribe to a topic to the broker cluster. In such case, the method may further comprise the master node identifying the client to receive the message based on a topic of the received request containing a payload for a message.

The method may further comprise sending the message to the client that has the client identifier. In such implementations, after sending the message to the client that has the client identifier, the master node may delete the message from the storage at the master node. The master node may also send a message to cause the follower node to delete the message.

Storing a message formed based on the key and the payload as a key-value pair may comprise storing the message in a storage. The messages in the storage may be sorted by a byte order of the keys.

According to a second aspect of the invention there may be provided an information processing apparatus configured to perform the role of a master node in a broker cluster that comprises a plurality of nodes, wherein the information processing apparatus is configured to: maintain a counter and perform a method comprising: receiving, at the master node, a request containing a payload for a message to be stored at the master node; generating, by the master node, a key for the message, wherein the key comprises at least: a client identifier of a client to receive the message, and a sequence number from the counter of the master node, and storing a message formed based on the key and the payload as a key-value pair at the master node.

A further aspect of the present invention may provide a program that, when performed by an information processing apparatus, causes the information processing apparatus to perform a method according to the first aspect.

Further features and advantages of the invention will become apparent from the following description of preferred embodiments of the invention, given by way of example only, which is made with reference to the accompanying drawings.

DETAILED DESCRIPTION

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Embodiments of the present disclosure relate to the transmission of messages between a client and broker in a publish/subscribe system. Embodiments described herein address problems related to how to improve storage and retrieval of messages that include key-value pairs. For example, some implementations allow a consistent ordering of messages to be maintained at the broker.

Figure 1:
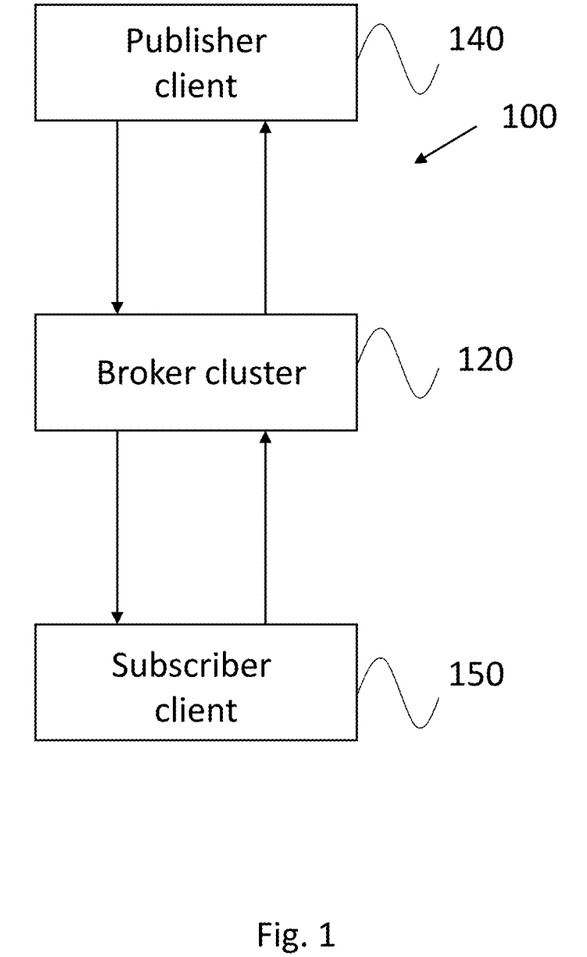
FIG. 1 is a schematic diagram showing a messaging system.

FIG. 1 is a schematic diagram showing a messaging system 100 within which examples of the present disclosure may be implemented.

The system 100 comprises a data broker cluster 120, a publisher client 140, and a subscriber client 150. While FIG. 1 shows one subscriber client 150 and one publisher client 140, in general there may be more than one and potentially a large number of publisher and subscriber clients. The publisher client 140 generates data which is transmitted (or 'published') to the data broker 120. Examples of such clients are sensor devices, measuring devices, or other sources of sensor data. These 'publisher clients' 140 may be Internet-of-Things devices. The sensor data may be machine-type communication (MTC) data. Herein the term 'publisher client' refers to clients which generate and publish data to the data broker cluster 120. Similarly, the term 'sensor data' may be used herein to refer to data generated by publisher clients for the purposes of describing examples of the present disclosure without limiting the scope of the present disclosure.

The system illustrated in FIG. 1 is an example of a 'publish/subscribe' architecture. That is, the data broker cluster 120 may receive data which has been published (that is, transmitted towards the data broker cluster 120) by each of the publisher clients 140 and forward it to any subscriber client 150 which has subscribed to receive that data. A subscriber client 150 may subscribe to receive certain data by sending a request, referred to as a 'SUBSCRIBE' request, to the data broker cluster 120. Subscriber clients 150 thus receive data, such as sensor data published by publisher clients 140, from the data broker cluster 120. A client may both transmit data towards the data broker cluster 120 and receive data from the data broker cluster 120. Such a client is both a subscriber client and a publisher client.

The use of a publish/subscribe architecture may avoid the need for subscriber clients to connect to each publisher client of interest, can reduce transmissions over the communications networks, and can simplify the implementation (with accordingly reduced processing requirements) for publisher clients 140 and subscriber clients 150.

In the example of FIG. 1, publisher client 140 connects directly to the data broker 120 via first communications network, while the subscriber client 150 connects via a second communications network.

The communications networks may each comprise one or more different physical networks which are interconnected. For example, and without limiting the scope of the present disclosure, the communications network may include the public internet, and one or more local area networks.

The communications networks may be wireless communications networks, operating according to a cellular wireless communications specification, such as in accordance with the 3GPP 2G (GSM/GPRS/EDGE), 3G (UMTS), 4G (LTE) or 5G (NR) standards or in accordance with a local area or personal area wireless communications network, such as in accordance with an IEEE 802.11 standard, a Bluetooth standard, or a Zigbee.

In some embodiments, either or both of the communications networks may be particularly suitable for highly constrained devices and may accordingly use a suitable communications protocol such as Zigbee or Bluetooth. The communication networks may be a combination of the networks described above.

References to particular standards or specifications herein are not intended to be limiting and it will be appreciated that the examples of the present disclosure may be implemented in accordance with any suitable standards, including ones which are developed in the future.

Figure 2:
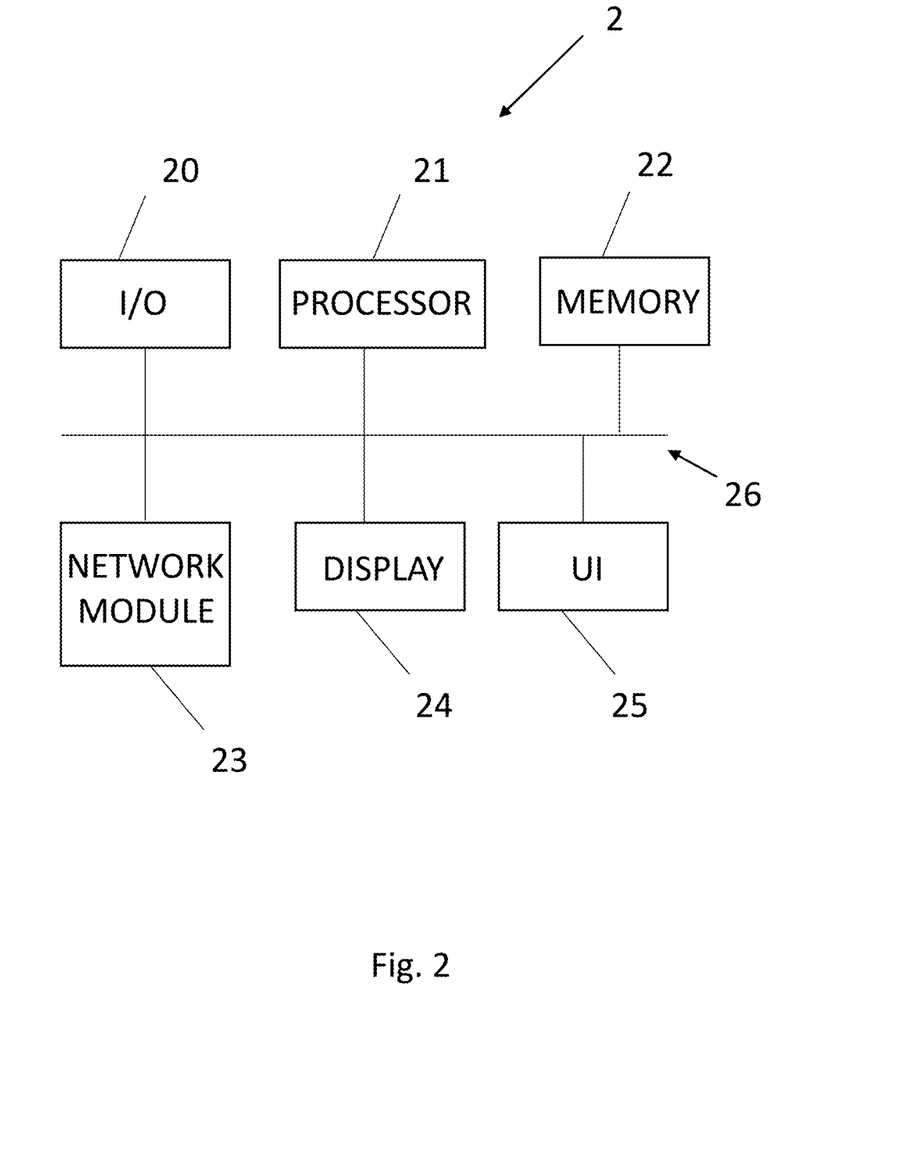
FIG. 2 is a schematic diagram of components of an example information processing apparatus.

FIG. 2 is a schematic diagram of components of an example information processing apparatus. The publisher client 140, servers or other hardware that implements the broker cluster 120, and the subscriber client 150 may be implemented in different hardware configurations. These hardware configurations are exemplified by the information processing apparatus 2. The diagram is illustrative and different hardware configurations for information processing apparatus are possible as is well known in the art. The information processing apparatus includes an I/O interface 20, such a USB port, Thunderbolt port, etc. to which an additional device, such as a storage device, could be connected. The information processing apparatus comprises a processing unit in the form of a processor 21, such as a CPU, a storage in the form of memory 22, a network module 23, a display 24, and a user interface 25. The network module 23 may allow the information processing apparatus to communicate over a network such as the networks described above. The user interface may include components such as a keyboard, mouse, camera, etc. The components of the information processing apparatus may communicate with each other over a bus 26. Further components may be provided but are not shown or described. For simpler publisher clients not all components are required. For example, some components, such as the display 24 and UI 25 may be omitted.

Any of the steps of the methods described herein may be performed by computer-readable instructions of one or more programs stored in a storage and executed by a processing unit on one or more information processing apparatuses.

Returning to FIG. 1, the data broker cluster 120 may transmit and receive messages, directly or indirectly, to/from publisher clients and to/from subscriber clients. These messages may be transmitted in accordance with a publish/subscribe messaging protocol. These protocols may operate in a connection-oriented manner: that is, the messaging protocol may provide the concept of a logical connection between a client and the broker cluster 120, via which data or requests may be transmitted.

The transmission of data (publishing) and of requests (for example, SUBSCRIPTION requests, CONNECTION requests, DISCONNECTION requests, UNSUBSCRIBE requests) may be in accordance with a suitable protocol or standard. In a particular example, the protocol may be selected from one of the following variants of MQTT:

1. MQTT-versions 3.x and 5.x
2. MQTT-SN (MQTT For Sensor Networks)—versions 1.2 and 2.0

These variants are generally referred to as MQTT in the description below.

Each variant is designed and optimized for different networking environments and transports. In the absence of any constraints, MQTT deployed across transmission control protocol (TCP) over internet protocol (IP) transport (often using transport layer security, TLS) is preferable as it can provide fault tolerance, lower latencies and better network presence. In contrast, MQTT-SN is designed to be used with "connectionless" transports such as UDP, suitable for being deployed in more constrained network environments, for example using a 3GPP narrowband internet of things (NB-IoT) or non-terrestrial network (NTN) communications network, where bandwidth and maximum transmission unit (MTU) size restrictions apply, and/or where TCP/IP may be impractical or prohibited.

MQTT-SN can use less power and bandwidth than MQTT operating over TCP/IP, but because UDP is "connectionless", there may be increased levels of packet loss and latency compared with MQTT operating over TCP/IP.

In accordance with the MQTT protocols, one or more SUBSCRIBE request may be sent from a subscriber client 150 to the broker cluster 120. The SUBSCRIBE request is used by the subscriber client to specify to the data broker cluster 120 which topics the subscriber client is interested in receiving messages about. When a client subscribes to a topic, the broker cluster 120 then keeps track of the subscription in a persistent session and forwards any messages published to that topic to the subscriber client.

The publisher client sends one or more requests to the broker cluster 120 using a publishing workflow. In a first step, the publisher client sends a PUBLISH request to the broker cluster 120. The PUBLISH request includes a topic and a payload that is content for the message to be published. The broker replies with a PUBREC (publish received) message that acknowledges the PUBLISH request. In a third step, the client sends a PUBREL (publish release) request to the broker cluster 120, which authorises the broker cluster to send the message to subscribers. In a fourth step, the broker cluster 120 sends a PUBCOMP (publish complete) message to confirm that the broker cluster 120 has received and processed the PUBREL request.

A further feature of the broker cluster 120 implementing MQTT is message persistence. Message persistence aims to prevent messages being lost in the event of a network or server failure. In MQTT, message persistence is achieved by storing messages on the broker cluster 120 until they are delivered to the subscriber clients 150.

MQTT provides three types of message persistence options:

Non-persistent: In this mode, messages are not stored on by the broker cluster 120 and are lost if a server on the broker cluster 120 fails or the network connection to the subscriber client 150 fails. The non-persistent mode is suitable for situations where messages are not critical and can be easily regenerated.

Queued persistent: In this mode, messages are stored on a server of the broker cluster 120 until they are delivered to the subscriber client 150. If the subscriber client 150 is not available, messages are queued until the subscriber client 150 reconnects. Queued persistence is useful when the subscriber client 150 is not always connected to the broker cluster 120, or if the subscriber client needs to receive all messages, even if they are sent when the subscriber client 150 is offline.

Persistent with acknowledgment: This mode provides the highest level of message persistence. In this mode, messages are stored on a server of the broker cluster 120 until they are delivered to the subscriber client 150, and the subscriber client 150 must acknowledge receipt of the message. If the subscriber does not acknowledge receipt, the message is re-sent until the subscriber acknowledges receipt. This mode is useful when it is critical to ensure that messages are received and processed by the subscriber. The methods below are relevant to the queued persistent and persistent with acknowledgement modes in which messages are stored by the broker cluster 120.

A requirement of MQTT is that messages should be delivered to the subscriber client 150 in the same order that the payloads associated with the PUBLISH requests were received by the broker cluster 120 from the publisher client 140.

Related to the persistence options are three quality of service (QoS) options. These options are associated with message topics that are sent by publisher clients but impact the way in which the messages are sent by the broker cluster 120 to the subscriber client.

QoS 0 (at most once): This level provides no guarantee that a message will be delivered to the subscriber client. The message is sent by the broker cluster 120 to the subscriber client 150 once, and if it is lost or not received by the subscriber client 150, it will not be resent.

QoS 1 (at least once): This level ensures that a message is delivered to the subscriber client at least once, but it may be sent by the broker cluster 120 (and delivered) to the subscriber client multiple times in the case of network issues or failures.

QoS 2 (exactly once): This level provides the highest level of assurance for message delivery. The message is sent by the broker client 120 and is considered to be delivered to the subscriber client 150 exactly once when an acknowledgement sent from the subscriber client 150 to the broker cluster 120 is received.

To implement the QoS options, each of the subscriber client 150 and broker cluster maintains a persistent session state associated with a client identifier. The broker cluster 120 stores details of the subscriptions from the subscriber client 150 as part of the session state.

The broker cluster 120 is a distributed system that represents one logical MQTT broker. The broker cluster 120 consists of two or more different broker nodes that may be installed on different information processing apparatus and are connected over a network (not shown). From the subscriber client's and the publisher client's perspective, the broker cluster 120 depicted in FIG. 1 behaves like a single MQTT broker as illustrated in FIG. 1.

The broker cluster 120 may be implemented on a cloud environment. Such implementations may have advantages in scalability, elasticity, and resilience. The broker nodes may be implemented as virtual machines on the cloud infrastructure. In other implementations, the broker cluster 120 may be implemented as virtual machines in an on-premises data center infrastructure. Other hardware and software configurations are possible and may be used in further implementations.

Within the broker cluster 120, it is desirable to manage the workload between the broker nodes to manage performance. To distribute workload among broker nodes in the broker cluster 120, a partitioning scheme is implemented so that different clients are handled by different broker nodes. Each of the publisher clients 140 and subscriber clients 150 has an assigned unique client identifier (Client ID) that is generated during a registration process with the broker cluster 120. Further, each broker node has a unique broker identifier (Broker ID). Clients are assigned to broker nodes based on the client identifier. A problem with using the client identifier for assigning clients to broker nodes is that the workload may cluster depending on the identifiers given to the clients. Accordingly, the nodes of the broker cluster use a hash of the client identifier associated with requests to distribute the workload associated with clients among the broker nodes. Requests from subscriber clients 150 or publisher clients 140 are then assigned to nodes based on a range of possible hash values. As the requests are distributed based on a range of hash values, a suitable hash functions may produce a hash value of predetermined length (e.g. MD5, MurmurHash or SHA-3).

Data items are distributed across the broker nodes by consistent hashing with virtual nodes. Briefly, to implement consistent hashing, each server is assigned a range of hash values, and each client identifier is hashed and allocated to a broker node with the closest matching hash value range. For example, if there are four broker nodes with hash value ranges 0-63, 64-127, 128 to 191 and 192-255, and a hash of a received client identifier has a hash value of 75, the message including the client identifier will be allocated to the second server. In consistent hashing, a virtual node is a logical representation of a physical server in the cluster. Instead of assigning a single hash value range to each physical server (or virtual machine in a cloud or other implementation), multiple virtual nodes may be used to represent a single physical server, each with its own unique hash value range. The use of virtual nodes allows the system to distribute workload more evenly across the broker cluster 120, as it allows for a finer-grained control over the distribution of hash values. Instead of having a small number of large hash value ranges, the virtual nodes allow for a larger number of smaller hash value ranges, which can more evenly distribute the responsibility for client identifiers across the broker cluster.

The broker cluster 120 is stateful, which is to say that it aims to preserve the data stored, including messages to be delivered, by the broker cluster 120 even if one of the broker nodes becomes unavailable. The broker nodes are independent over the hash ranges for which they are responsible. A broker node that is responsible for a particular client identifier is referred to herein as the master node. In order for data to be replicated to provide fault tolerance each node may also act as a follower node for another range of hash values. The follower node does not communicate with a client directly but serves as a back-up as will be described in further detail below. A broker node may act as both a master node for a first range of hash values and as a follower node for a second range of hash values.

A master node acts as a master node for some subset of subscriber client data (called a shard or a partition) defined by the range of hash values as discussed above. The master node is responsible for stored message data for the subscriber client 150 in a sense that only a node in the broker cluster 120 with the master role is allowed to modify message data for this client directly. The followers may only perform modification of stored message data for a subscriber client 150 based in the subset based on a command issued by the master node.

The followers 'follow' the master in a sense that the follower node is configured to catch up with the state of the master node as soon as possible. This can be done in a push or pull fashion. In the case of a push model, the master node proactively sends modification requests to the follower nodes. This approach incurs more work on the master node but tends to reduce the time that is required to modify the message data across the broker cluster 120.

The use of the master broker nodes for a data partition as discussed above avoids a single point of failure issue that some distributed systems suffer from as the master node is responsible only for a subset of the message data in the broker cluster 120. The role of the master is passed onto one of the followers should the master go down. This process is referred to as a failover.

In this case, since followers closely follow the data state of the master, they can pick up from where the master left off quickly. Of course, if, by coincidence, the master and all its followers go down at the same time, then the data becomes unavailable regardless of how many more nodes in the broker cluster 120 are still operational. More typically, if one of the follower nodes that is storing replicas of the messages held by the master node should fail and there are other follower nodes associated with the master node in the system (i.e. a replication factor is two or greater), then one of the other nodes in the broker cluster 120 will become a follower node. In that case, the message data needs to be sent over from the one of the remaining replicas (followers or a master, depending on the design of the system) to the node that became a follower node in order to match the replication factor configured for the system. Following that process, the set of replicas for the given subset of message data, remains unchanged in terms of its size following failure of a follower node.

Figure 3:
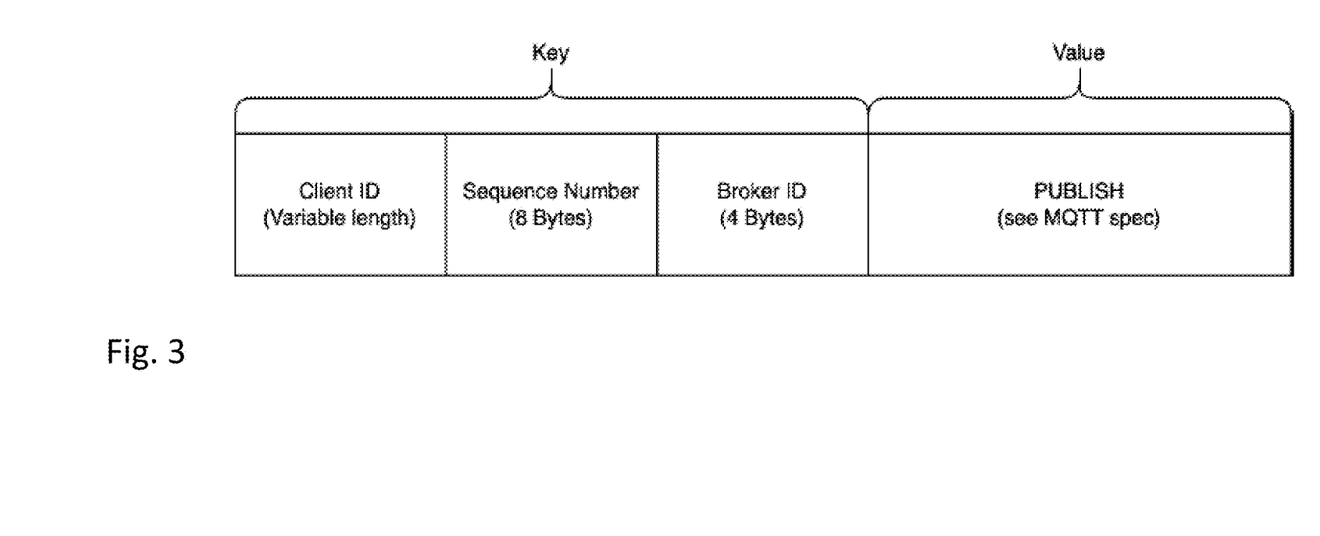
FIG. 3 shows the structure of a stored publish message.

FIG. 3 shows the structure of a stored publish message (also referred to herein as a message) that is to be stored in a key-value store of a broker node. The publish message is formed of a key-value pair. The key is formed of the client ID of the subscriber that is supposed to receive the message (as will be explained in more detail below), a sequence number and a broker ID of the master broker node which adds the message to its store. The 'value' contains the contents to be stored with the key and may represent a some or all of the payload received in a request from a publisher client 140. Further information may be included in the value such identification of the topic and other information specified for PUBLISH messages in the MQTT standard. The sequence number is a number of a counter that is maintained by the broker node. Each broker maintains a separate counter and accordingly the values of the counters at the different broker nodes can be (and likely will be at various times) different. The counters may strictly increase (i.e.

monotonically increase) in value so that the counter values don't ever decrease. The sequence number is increased each time a message is stored by a broker node in its store. The counter is configured with a large number of bits to represent the sequence number such that the available sequence of numbers is unlikely to run out over the normal lifetime of the system.

As noted in the previous paragraph, the key-value pairs are stored in a store at the master broker node. The messages (key-value pairs) are stored after the master node has determined matching subscriptions and before messages are sent to subscriber clients. If there are multiple subscriber clients subscribed to a topic, a separate message is stored at the master node for each subscriber client subscribed to the topic to which a received PUBLISH message relates.

Figure 4:
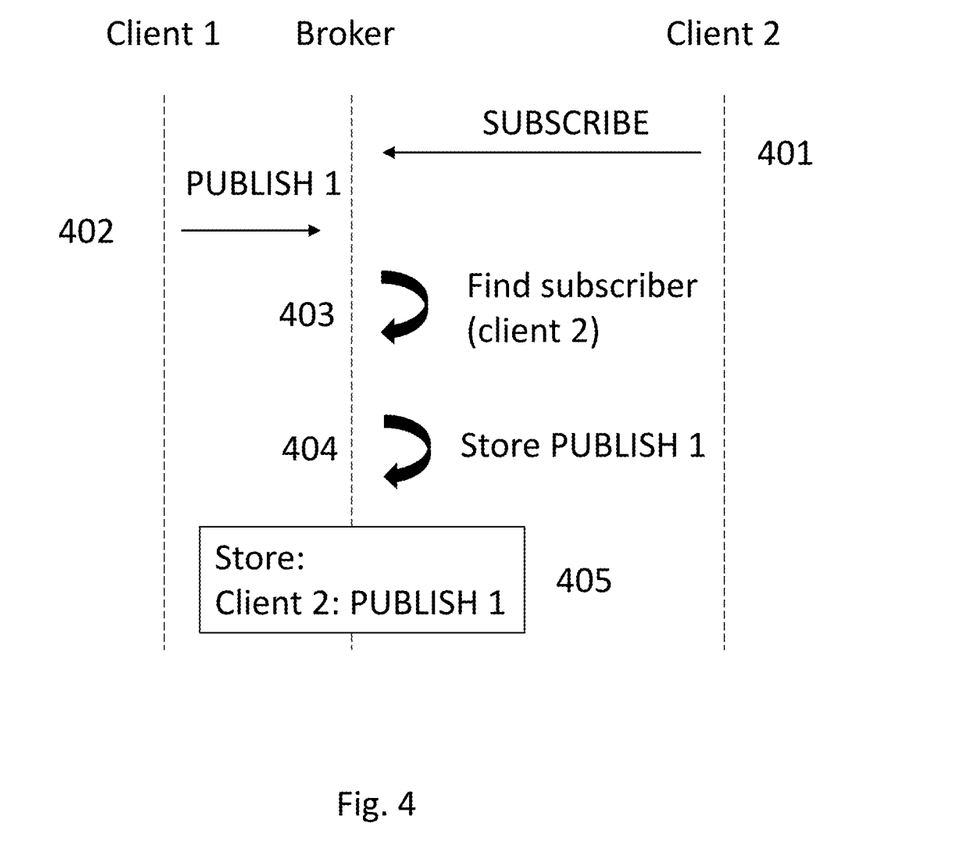
FIG. 4 is a swim-lane diagram illustrating the basic processing of a PUBLISH request.

FIG. 4 is a swim-lane diagram illustrating the basic processing of a PUBLISH request received from a publisher client. Client 1 shown in FIG. 4 is a publisher client and client 2 is a subscriber client. In a step 401, client 2 sends a SUBSCRIBE request to the Broker. As noted above, the broker cluster 120 generates a session in association with the client identifier of client 2. The SUBSCRIBE request specifies a topic that the subscriber wishes to receive messages in connection with. Sometime later, Client 1 sends a first PUBLISH request to the broker in step 402. The PUBLISH request also includes a topic field. In this example, the topic matches the topic that Client 2 has subscribed to. The broker searches in step 403, for subscribers to the topic and finds the subscriber, client 2, and then stores a message for PUBLISH 1 in the key value store in step 404. At the time that the broker stores the PUBLISH request in the key-value store the broker generates a key. The key for the key-value pair is generated as described in connection with FIG. 3. That is to say, the key is formed of the client ID of the subscriber, a sequence number, and the Broker ID of the node that generates the key. Accordingly, the broker has the identity of the subscriber client that the message is being stored for. The message stored in the store at the broker is shown in at 405.

In a more complicated situation in which multiple subscriber clients are subscribed to a topic and each subscriber client is to receive a copy of the message, the message is stored multiple times in the key-value store. A message is stored for each subscriber client that is to receive the message and has the respective client's client ID and a new counter value in the key of the message. The PUBLISH messages are stored in the key-value store such that they are sorted via the unsigned byte order of the keys. The keys are structured in a way that ensures that the PUBLISH messages are delivered in the order that they are stored in the key-value store. As will be discussed further, the keys are unique in the distributed Broker cluster 120 meaning that different PUBLISH messages can't have the same key.

In a case (not illustrated) that the subscriber client is connected to the broker, the broker will send messages stored in the store associated with the client's identifier to the client. The messages for the client may be identified by the client ID and the order in which the messages are to be delivered can be determined by the sequence number, which as noted above, increases each time a message is stored in the store.

The simple example illustrated in FIG. 4 shows only a single broker because the method does not rely in on the distributed broker nodes. However, the method is equally applicable to a broker cluster.

Figure 5:
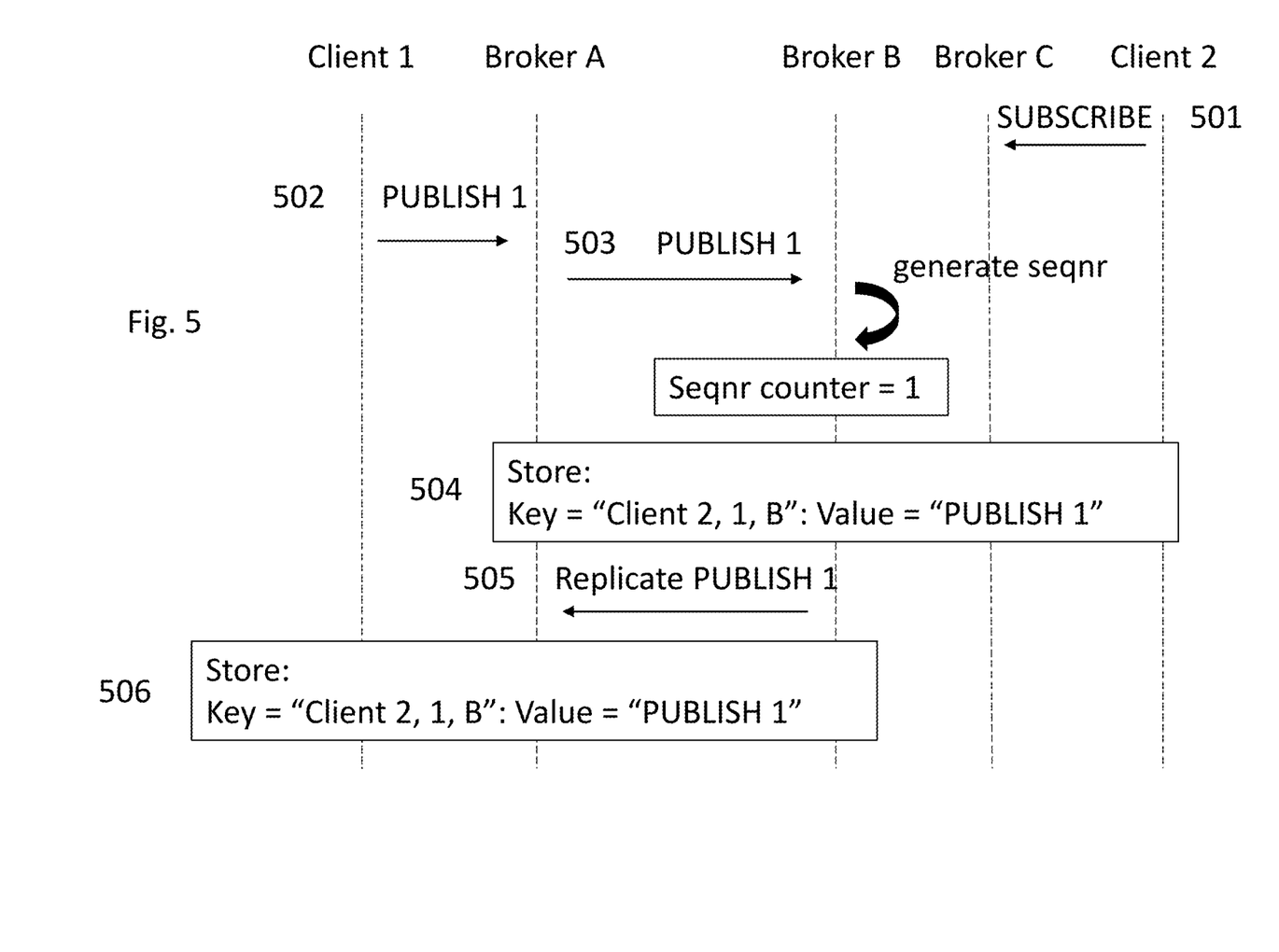
FIG. 5 is a swim-lane diagram illustrating replication of stored messages.

FIG. 5 is a swim-lane diagram illustrating replication of stored messages. In this example a replication factor is set to cause one replica version of each message to be stored. In other words, there is a master node and one follower node that stores duplicates of the messages. In FIG. 5, Client 1 is a publisher client and client 2 is a subscriber client. Broker A, Broker B, and Broker C are nodes of the broker cluster. Broker C is the master node for Client 2 and Broker B is the master node for Client 1. In step 501 Broker C receives a SUBSCRIBE request from Client 2. The SUBSCRIBE message specifies a topic subscribed to. As Broker C is the master node for Client 2, Broker C generates a session in association with the client identifier of client 2. The subscription information is distributed among the Brokers (Broker A, Broker B, and Broker C) including details of the topic subscribed to.

Sometime later, at step 502, Client 1 sends a PUBLISH request to Broker A. The PUBLISH message specifies a topic. Broker A is not the master node for Client A. Accordingly, Broker A identifies Broker B as the master node based on a hash of the Client 2 identifier and forwards the PUBLISH request to Broker B at step 503. At step 504, Broker B identifies the subscriber 'Client 2' based on the topic specified in the PUBLISH message and the distributed subscriber information. The Broker B uses its current counter value to generate a key, increments its counter by one, and stores the PUBLISH message at Broker B. The key is generated as described above in connection with FIG. 3. As the message is to be replicated, at step 505 Broker B sends the PUBLISH message to follower node, Broker A, to store a replica PUBLISH message.

At step 506, Broker A stores the PUBLISH message in its local store. The follower node does not update the counter in the key of the message. In other words, the message is stored as a replica of the message stored by Broker B.

In a case (not illustrated) that the subscriber client is connected to the broker cluster 120, broker B will send messages stored in the store to subscriber client 2. The messages for Client 2 may be identified by the client ID and the order in which the messages are to be delivered can be determined by the sequence number, which as noted above, increases each time a message is stored in the store.

Once a message has been sent (in accordance with the set QoS level), Broker B sends a delete request to the follower nodes. In response to the delete request, the follower nodes look up the message that has been sent and delete the message from their respective stores.

Figure 6A:
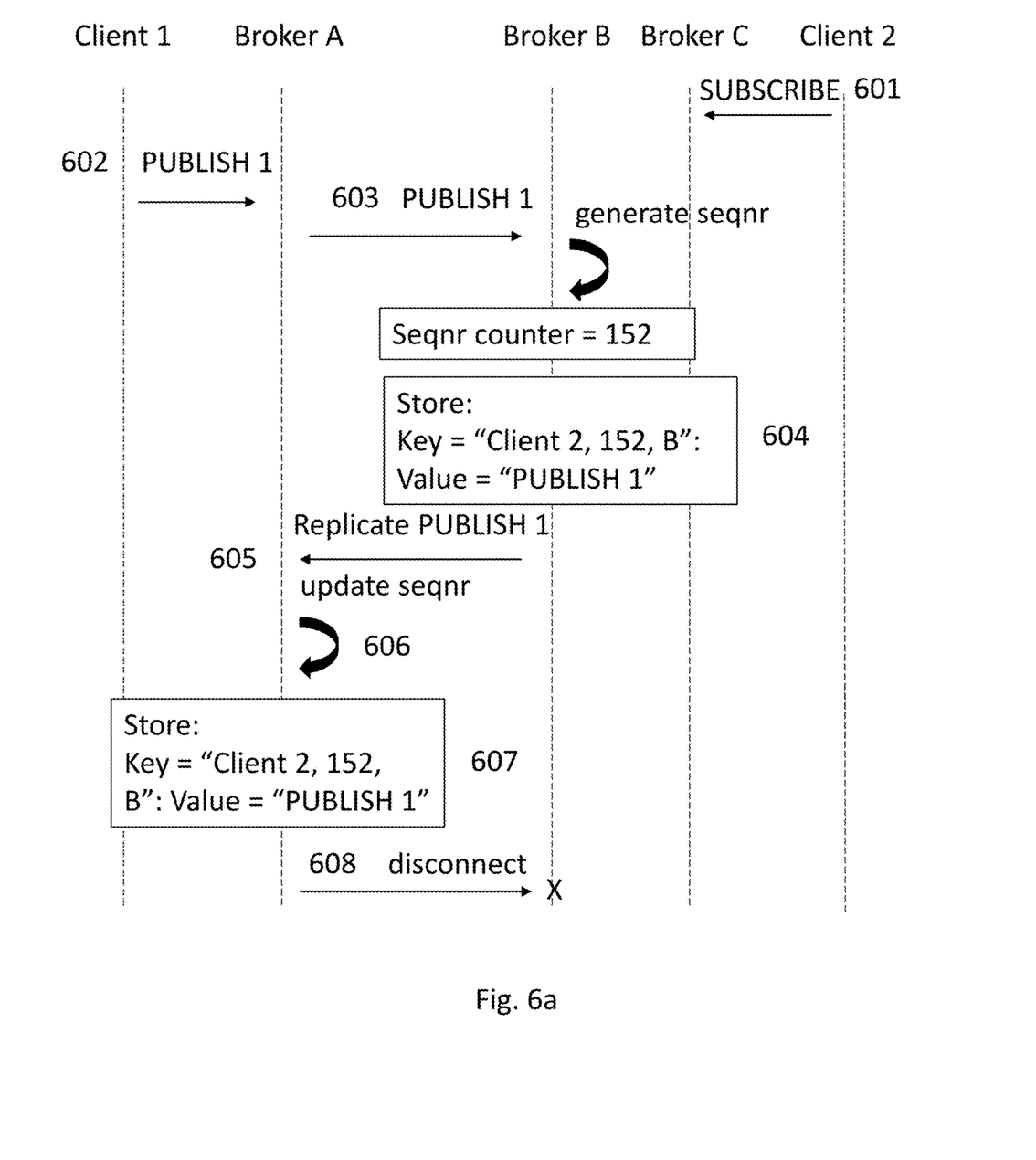
FIGS. 6a and 6b are a swim-lane diagram that illustrates management of counters between brokers.
Figure 6B:
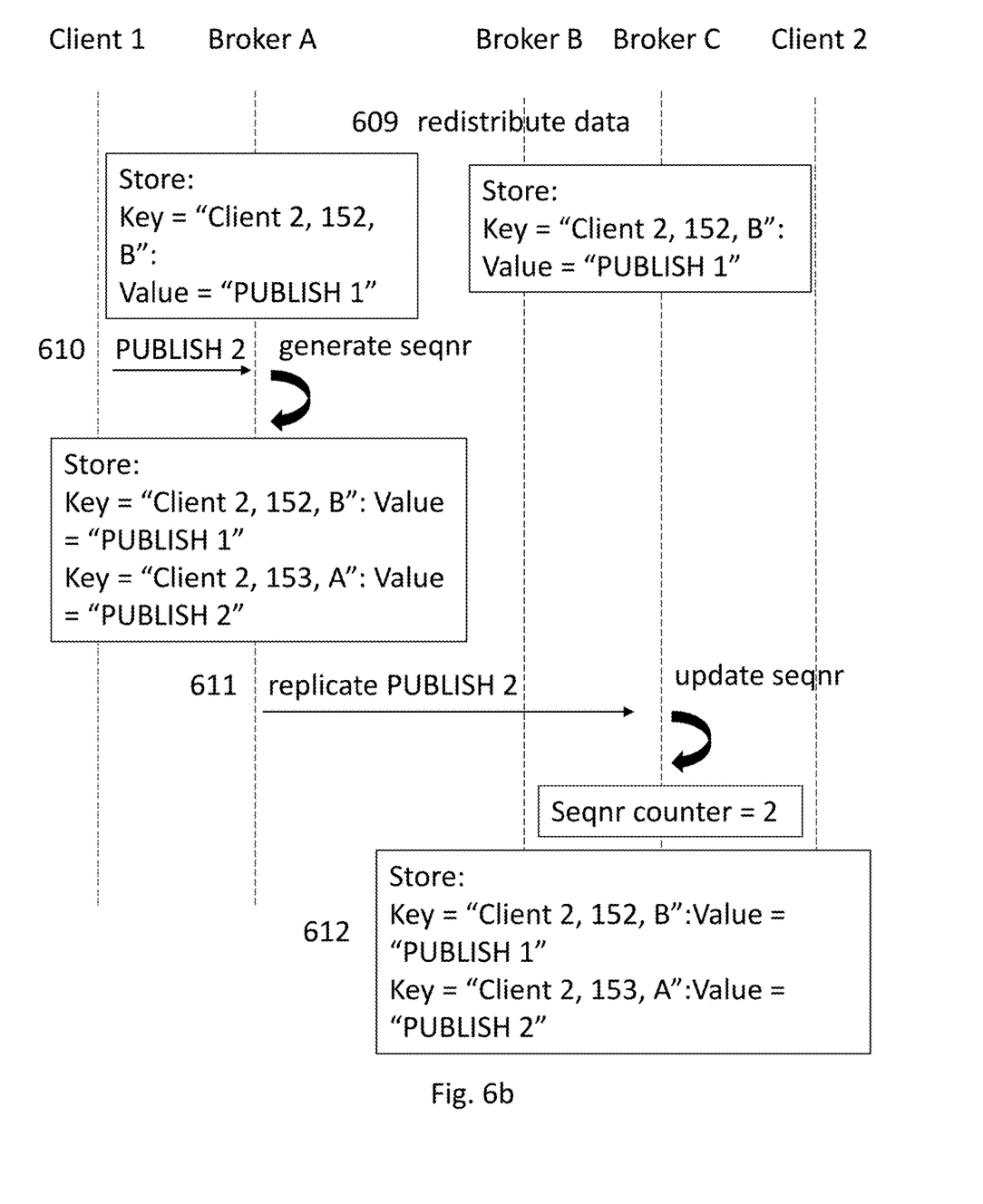

FIGS. 6a and 6b are a swim-lane diagram that illustrates management of counters between Brokers. The method depicted in FIG. 6a is continued in FIG. 6b. As described above, each Broker has a separate counter. In this example the replication factor is set to cause one replica version of each message to be stored. Client 1 is a publisher client and client 2 is a subscriber client. Broker A, Broker B, and Broker C are nodes of the broker cluster. Broker C is the master node for Client 2 and Broker B is the master node for Client 1.

In step 601, Client 2 receives a SUBSCRIBE request from Client 2. As Broker C is the master node for Client 2, Broker C generates a session in association with the client identifier of client 2. The generated subscription information is distributed among the Brokers (Broker A, Broker B, and Broker C). This step is the same as step 501 above.

Sometime later, at step 602, Client 1 sends a PUBLISH message to Broker A. Broker A is not the master node for Client A. Accordingly, Broker A identifies Broker B as the master node based on a hash of the Client 2 identifier and forwards the PUBLISH message to Broker B at step 603. At step 604, Broker B identifies the subscriber 'Client 2' based on the distributed subscriber information. The Broker B uses its current counter value to generate a key, increments its counter, and stores the PUBLISH message at Broker B. In the example shown in FIG. 6a, the counter number is at a value of 152. As the message is to be replicated, at step 605 Broker B sends the PUBLISH message to follower node, Broker A, to store a replica PUBLISH message.

In the example shown in FIG. 6a, the sequence number of the counter at Broker A may be behind (i.e. lower than) the value of the sequence number used to generate the message by Broker B. In this case, the sequence number at Broker A is brought forward at step 606 to be at least one greater than the sequence number of the received PUBLISH message. For example, if the sequence counter at Broker A had been at 131, the sequence number would be updated to 153, which is the next number after 152 which has already been used in a message key.

At step 607, Broker A stores the PUBLISH message in its local store. The follower node does not update the counter in the message. In other words, the message is stored as a replica of the message stored by Broker B.

In this example, sometime later, at step 608, Broker B is disconnected. This could be due to a network failure, Broker B crashing, routine maintenance work or for any other reason.

Referring now to the top of FIG. 6b, at step 609 message data is redistributed. The removal of Broker B will result in a reallocation of the relevant hash ranges and responsibilities for the virtual nodes that Broker B was responsible for. The data stored in the store at Broker B is replicated at Broker A as described above, accordingly the messages are available to be reallocated. The replication is arranged so that the follower node will take over as master node. If there are a several follower nodes, one of the follower nodes takes over as the master node. This transfer of responsibilities is efficient because it tends to reduce the required transfer data between broker nodes during the redistribution. The new master node will cause the messages for clients for which it is newly responsible to be duplicated to a new follower node so that the appropriate replication factor is maintained following the loss of Broker B.

Following redistribution, Broker A, which was the follower node has become the master node for Client 1 and Broker C has become the follower node and has a replica of the message for Client 2 stored in its data store as illustrated.

In step 610, a second PUBLISH message on the same topic is received from Client 1. The message is received at Broker A, which is now the master node for Client 1. As with the first PUBLISH message, Broker A uses the current sequence number on the counter to generate the key along with the client ID of the subscriber (Client 2) and the identity of the master node (Broker A). The sequence counter at Broker A is then advanced by one value. It is noted that because the sequence counter at Broker A was advanced to catch-up with the sequence number used in the replica message at step 606, the sequence number used to generate the key for the second PUBLISH message at step 610 will be larger than the sequence number used to generate earlier PUBLISH messages that are stored for the same subscriber client. In this way, the sequence number can be used to determine the order in which stored messages should be sent to the subscriber client.

As the message is to be replicated, at step 611 Broker A sends the PUBLISH message to follower node, Broker C, to store a replica PUBLISH message. Upon receipt, Broker C checks the sequence number in the received replica PUBLISH message and, if necessary, advances its counter to be at least one value ahead of the sequence number of the received message.

At step 612, Broker C stores the PUBLISH message in its local store. The follower node does not update the counter in the message. In other words, the message is stored as a replica of the message stored by Broker C.

As described above in connection with FIG. 5, Client 1 may connect to the broker cluster 120 and the master node, Broker A, will send messages to Client 1 and subsequently cause them to be deleted from its store and the stores of follower nodes.

Figure 7:
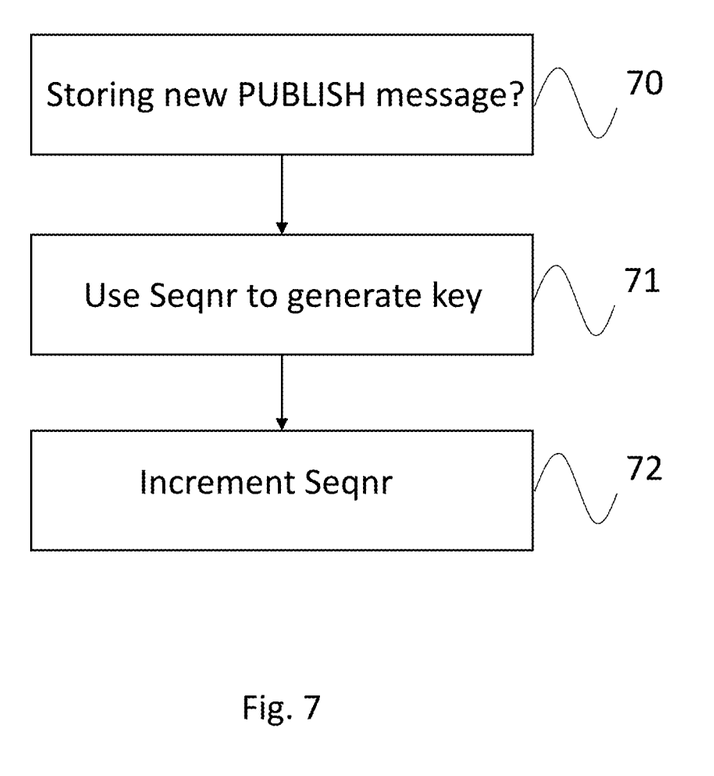
FIG. 7 is a flowchart showing logic performed by each broker node acting as a master node.

FIG. 7 is a flow chart showing logic performed by each broker node acting as a master node in the examples above. At step 70, the broker node determines that it is storing a new PUBLISH message for a subscriber client in connection with a PUBLISH request received from a publisher client. In step 71, the broker node uses the sequence number (Seqnr) from its counter to generate the key for the key-value pair that forms that stored message. More particularly, the key is formed of the client ID of the subscriber, a sequence number, and the Broker ID of the node that generates the key. In step 72, the Broker node increments the counter by adding 1 to the value Seqnr.

Figure 8:
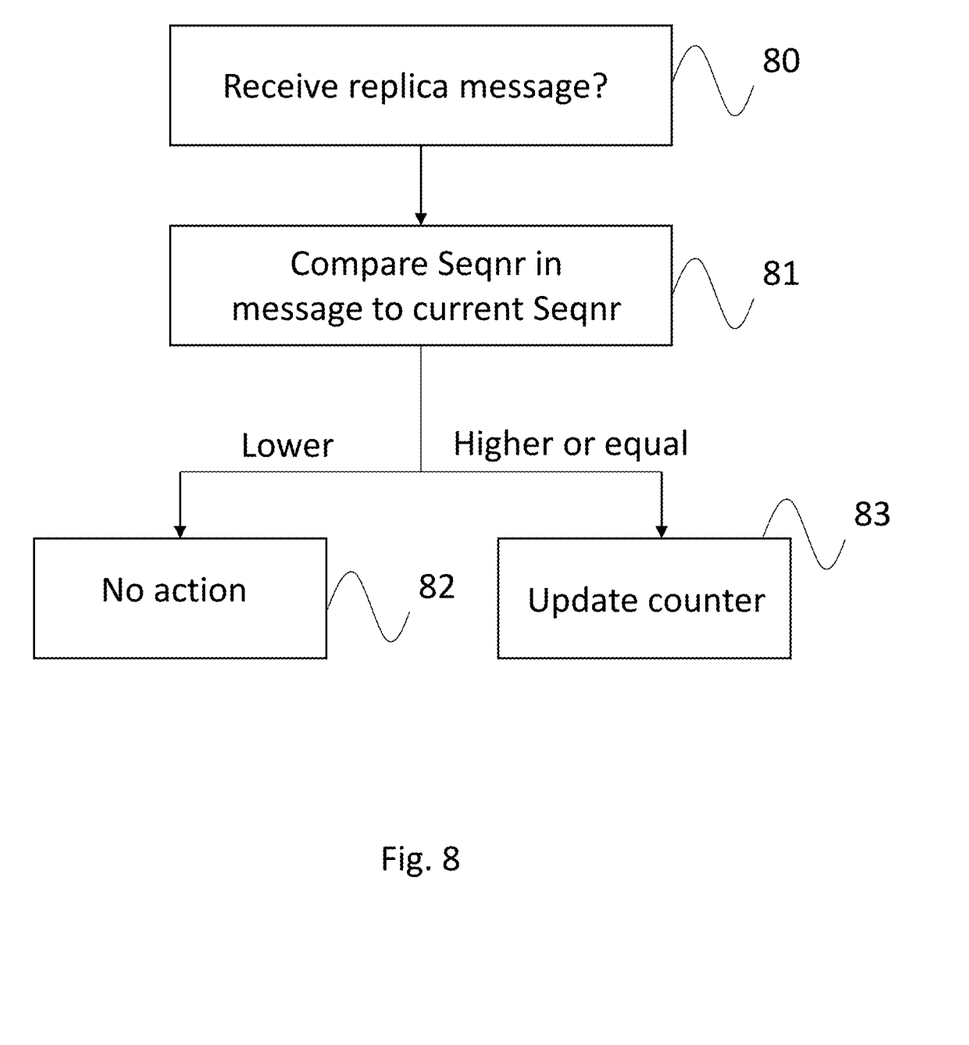
FIG. 8 is a flowchart showing logic performed by each broker node acting as a follower node.

FIG. 8 is a flow chart showing logic performed by each broker node acting as a follower node in the examples above. At step 80, the broker node determines that it has received and is going to store a replica message to be sent to a subscriber client. In step 81, the follower node compares the sequence number in the received replica message with a current value of Seqnr in the follower node's counter. If the Seqnr in the received message is lower than the current value of Seqnr on the counter of the Broker node, then no action is taken in step 82. If the Seqnr in the received message is higher than or equal to the current value of Seqnr on the counter of the Broker node, then the Seqnr at the Broker node is advanced at step 83 to the value following the value of Seqnr in the received message. While in this example, the Broker node is advanced to the value following the value of Seqnr in the received message, the value of the counter could be advanced to any number that is greater than the Seqnr in the received message while still enabling the messages to be sent to the subscriber client in the correct order in the event of a subsequent change in the master node for the subscriber client.

The above-described implementations may provide various advantages. The key described with reference to FIG. 3 is formed of three parts. The combination of the Client ID and the sequence number is enough to make the identifier unique within the broker cluster 120. This is because the sequence number of the master node is incremented each time a message is stored. Further, by moving on the sequence counter at follower nodes (as described with reference to FIGS. 6a, 6b and 8 above) if there is a change in the master node, later messages received from the same client should also receive a later sequence number resulting in a unique number for each message.

The use of a unique key makes searching easier and faster. Accordingly, when a master node sends a message to one or more follower nodes to cause the follower node to delete a message, the look-up of the message to be deleted at the follower node can be quicker and less expensive. Further, when the master node needs to look up messages to send to a subscriber client, this look-up can also be less expensive.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of managing messages in a broker cluster, wherein the broker cluster comprises a plurality of nodes each of which maintains a separate counter, the method comprising:
   a master node in the broker cluster receiving a request containing a payload for a message to be stored at the master node;
   generating, by the master node, a key for the message, wherein the key comprises at least:
      a client identifier of a client to receive the message, and
      a sequence number from the counter of the master node, and
   storing a message formed based on the key and the payload as a key-value pair in a storage at the master node;
   sending, by the master node, the message to at least one follower node of the plurality of nodes in the broker cluster for storage;
   the at least one follower node, upon receiving the message, comparing the sequence number used to generate the key of the message with a sequence number of a counter of the follower node and storing the message in a storage at the follower node;
   wherein in a case that the sequence number used to generate the key of the message is greater than or equal to the sequence number of the counter of the follower node, the follower node advances the sequence number of the counter of the follower node to a value greater than the sequence number used to generate the key.

2. A method according to claim 1, wherein the key further comprises an identifier of the master node that generates the key.

3. A method according to claim 1, wherein each counter is configured to increase strictly monotonically.

4. A method according to claim 1, wherein the request containing a payload for a message is received from a publisher client and an identity of the master node among the plurality of nodes is determined based on a hash of an identifier of the publisher client.

5. A method according to claim 1, wherein, in a case that the master node becomes unavailable, the follower node becomes the master node.

6. A method according to claim 5, wherein after the following node becomes the master node, the method comprises:
   receiving, at the master node of the plurality of nodes, a second request containing a second payload for a second message to be stored at the master node;
   generating, by the master node, a key for the second message, wherein the key comprises at least:
      an identifier of a client to receive the second message, and
      a sequence number from the counter of the master node, and
   storing a message formed based on the key and the payload as a key-value pair at the master node.

7. A method according to claim 1, wherein the client that receives the message is a subscriber client that has sent a request to subscribe to a topic to the broker cluster, wherein the method further comprises the master node identifying the client to receive the message based on a topic of the received request containing a payload for a message.

8. A method according to claim 1, further comprising sending the message to the client that has the client identifier.

9. A method according to claim 8, wherein after sending the message to the client that has the client identifier, the master node deletes the message from the storage at the master node.

10. A method according to claim 1, wherein storing a message formed based on the key and the payload as a key-value pair comprises storing the message in a storage, wherein the messages in the storage are sorted by a byte order of the keys.

11. A system comprising an information processing apparatus configured to perform the role of a master node in a broker cluster that comprises a plurality of nodes and an information processing apparatus configured to perform the role of a follower node in the broker cluster, wherein the master node comprises:
   at least one processor;
   and at least one memory including computer program code;
   the at least one memory and the computer program code being configured to, with the at least one processor, cause the master node to at least maintain a counter and
   perform a method comprising:
      receiving a request containing a payload for a message to be stored at the master node;
      generating a key for the message, wherein the key comprises at least: a client identifier of a client to receive the message, and a sequence number from the counter of the master node,
      storing the message formed based on the key and the payload as a key-value pair at the master node, and
      sending the message to the follower node of the plurality of nodes in the broker cluster for storage;
   wherein the follower node comprises:
      at least one processor;
      and at least one memory including computer program code;
      the at least one memory and the computer program code of the follower node being configured to, with the at least one processor, cause the follower node to at least perform a method comprising:
         upon receiving the message, comparing the sequence number used to generate the key of the message with a sequence number of a counter of the follower node,
         storing the message in a storage at the follower node, and
         in a case that the sequence number used to generate the key of the message is greater than or equal to the sequence number of the counter of the follower node, advancing the sequence number of the counter of the follower node to a value greater than the sequence number used to generate the key.

12. A non-transitory computer-readable storage medium storing a plurality of programs, wherein, when executed by a master node and a follower node in a broker cluster comprising a plurality of nodes each of which maintains a separate counter, the plurality of programs causes the master node to perform a method of managing messages, the method comprising:

receiving a request containing a payload for a message to be stored at the master node;

generating a key for the message, wherein the key comprises at least:
a client identifier of a client to receive the message, and
a sequence number from the counter of the master node, and storing a message formed based on the key and the payload as a key-value pair in a storage at the master node, and sending the message to at least one follower node of the plurality of nodes in the broker cluster for storage;

wherein the plurality of programs causes the follower node to perform a method comprising:

upon receiving the message, comparing the sequence number used to generate the key of the message with a sequence number of a counter of the follower node, storing the message in a storage at the follower node, and in a case that the sequence number used to generate the key of the message is greater than or equal to the sequence number of the counter of the follower node, advancing the sequence number of the counter of the follower node to a value greater than the sequence number used to generate the key.

13. A method of managing messages in a broker cluster, wherein the broker cluster comprises a plurality of nodes each of which maintains a separate counter, the method comprising:

a master node in the broker cluster receiving a request containing a payload for a message to be stored at the master node, wherein the request containing the payload for the message is received from a publisher client and an identity of the master node among the plurality of nodes is determined based on a hash of an identifier of the publisher client;

generating, by the master node, a key for the message, wherein the key comprises at least:
a client identifier of a client to receive the message, and
a sequence number from the counter of the master node, and storing a message formed based on the key and the payload as a key-value pair in a storage at the master node.

14. A method according to claim 13, wherein the method further comprises sending the message to at least one follower node of the plurality of nodes in the broker cluster for storage.

15. A method according to claim 14, wherein the follower node, upon receiving the message, compares the sequence number used to generate the key of the message with a sequence number of a counter of the follower node and stores the message in a storage at the follower node.

16. A method according to claim 15, wherein in a case that the sequence number used to generate the key of the message is greater than or equal to the sequence number of the counter of the follower node, the follower node advances the sequence number of the counter of the follower node to a value greater than the sequence number used to generate the key.

* * * * *